United States Patent Office 2,968,626
Patented Jan. 17, 1961

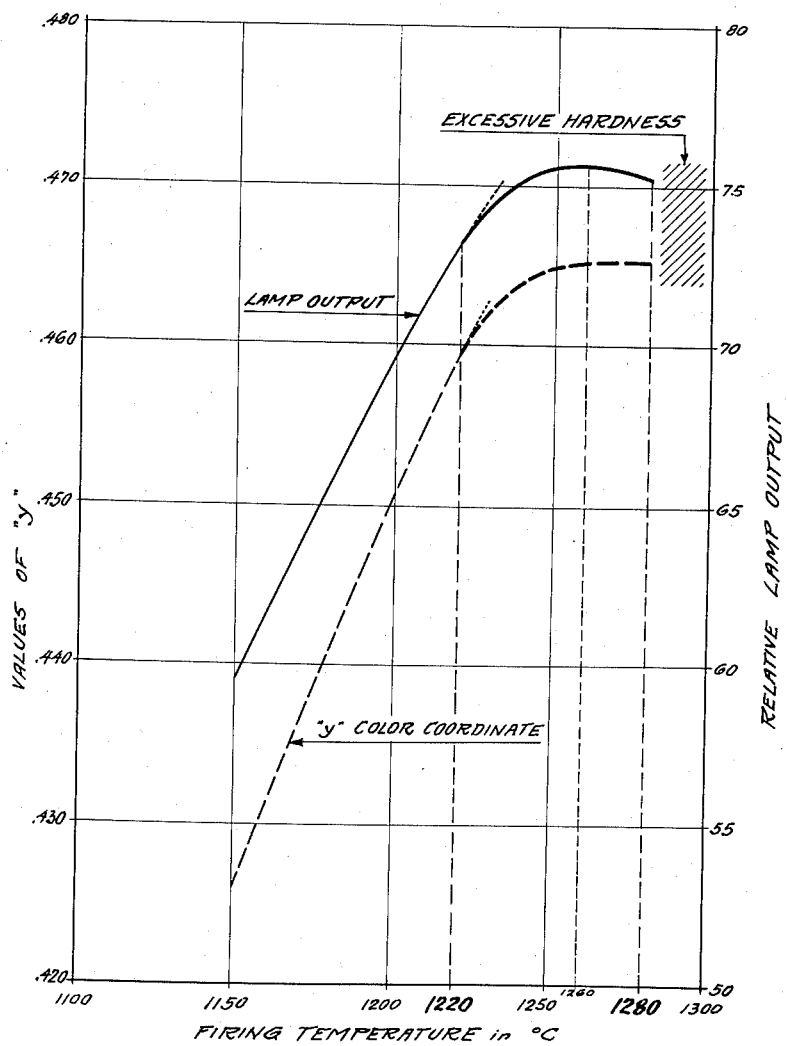

2,968,626

GREEN HALOPHOSPHATE PHOSPHOR

Henry W. Rimbach, Bloomfield, N.J., assignor to Westinghouse Electric Corporation, East Pittsburgh, Pa., a corporation of Pennsylvania Filed Apr. 10, 1956, Ser. No. 577,373

8 Claims. (Cl. 252—301.4)

This invention relates to phosphor materials and, more particularly, to phosphor materials of the halophosphate type for use in fluorescent lamps, and is a continuation-in-part of application Serial No. 308,295, filed September 6, 1952, titled "Phosphor" by the inventor herein and assigned to the present assignee, and now abandoned.

Heretofore halophosphate luminescent materials have been generally known and are described in U.S. Patent No. 2,488,733 to McKeag et al. As noted in this McKeag patent, halophosphates are generally represented by the formula $3M_3(PO_4)_2 \cdot 1M'L_2$ where L represents a halogen or mixture of halogens, and M and M' represent either different or identical bivalent metals or mixtures of such metals. Such a formulation as this may be called a mole of phosphor per se, but it is felt more accurate to term this the "phosphor unit." As is customary in the halophosphate art, this so-called phosphor unit is normally activated by antimony or antimony plus manganese. The elements of the phosphor unit may conveniently be represented by their relative molar proportions and the activator materials may conveniently be represented by their weight with respect to the weight of the phosphor unit.

Phosphors of the halophosphate type are noted for their efficient luminosity, stability and ease of handling in preparation, which makes their application in fluorescent lamps particularly desirable. The use of halophosphates has been somewhat limited by the lack of what may be termed a "good" green halophosphate, particularly for use in phosphor blends for the so-called delux types of fluorescent lamps. Where a green fluorescing material is desired for such delux lamps, it has been the practice to use zinc orthosilicate, activated by manganese. While this phosphor displays an excellent output in the green, its lumen maintenance is relatively poor, resulting in loss of output. In a blend this is particularly objectionable for if one component of the blend changes in output and the other components do not, the resultant color of the blend shifts accordingly.

With respect to the term "green" which is a relative expression, reference is made to "Handbook of Colorimetry" by Arthur C. Hardy, published by the Technology Press (1939), MIT, Cambridge, Mass. As therein disclosed, any color can be broken down into three coordinates, an "x" or red coordinate, a "y" or green coordinate and a "z" or blue coordinate. Since "x" plus "y" plus "z" always equal unity, the "x" and "y" coordinates can be plotted on a chart or diagram and from the indicated plot, the "z" coordinate is determinable. Such a diagram is called an ICI diagram, as is well known, and it is the "y" coordinate or green color value of the halophosphate phosphor material of this invention, as represented on this diagram, which is increased in accordance with the teachings of this invention. Also, by producing a halophosphate phosphor material which has a "y" coordinate of considerable magnitude, the phosphor color per se falls well above the so-called black body line on the ICI diagram. Red-emitting phosphors, such as calcium silicate activated by lead and manganese have a color which falls well below this black body line and by blending such a green-emitting halophosphate phosphor with a calcium silicate, for example, the resulting color of the blend can be made to fall approximately on the black body line or curve, which is desirable for the production of a white blend with a large percentage of the emission in the red region of the spectrum. This is, of course, desirable for color rendition.

It is the general object of this invention to provide a halophosphate phosphor material which has an efficient output with a high output in the green region of the spectrum.

It is a further object of this invention to provide a method for making a halophosphate phosphor material having a high output in the green region of the spectrum.

The aforesaid objects of the invention, and other objects which will become apparent as the description proceeds, are achieved by providing a strontium halophosphate material wherein the raw-mix constituents are carefully proportioned and the mixed raw-mix constituents are fired at very high temperatures in order to achieve the desired "y" coordinate for the phosphor.

For a better understanding of the invention, reference should be had to the sole figure of the accompanying drawing which illustrates the effect of firing temperature on the "y" coordinate and lamp output for the strontium halophosphate phosphor material of this invention.

The usual type of halophosphate phosphor material as actually used in commercially-available lamps is calcium halophosphate and such material is normally fired during preparation at about 1150° C. Substantially higher firing temperatures produce an excessively hard phosphor, although some limited types of such materials have been reported as fired up to temperatures of about 1200° C. While increasing the firing temperatures for the usual types of calcium halophosphate phosphor materials, up to near the point of excessive phosphor hardness, may in some cases improve the luminescent output slightly, the color of the phosphor material remains unchanged, and this is true for all halophosphate materials observed to date. It was thus unexpected that by increasing the firing temperatures for the improved strontium halophosphate of this invention, far beyond the temperatures normally used in preparing halophosphates, the "y" coordinate for the phosphor would be greatly increased, thereby rendering the phosphor competitive with regard to color with the previously used zinc orthosilicate.

In preparing the phosphor material of this invention the following raw-mix formulation is preferred:

| | Moles or percent by Wt. of Phosphor Unit | Molar Ratios with Respect to Phosphor Unit |
|---|---|---|
| SrO (8,157 grams) | 78.7 | 9 |
| $P_2O_5$ (3,954 grams) | 27.8 | 3.18 |
| $SrCl_2$ (236.6 grams) | 1.5 | .17 |
| $SrF_2$ (1,123 grams) | 8.9 | 1.02 |
| $Sb_2O_3$ (343 grams Sb) | 2.1% Sb | |
| Mn (169 grams Mn as carbonate with 45% Mn) | 1.2% Mn | |

Molar ratio of F to Cl equals about 6:1.

Total halide with respect to phosphor unit equals about 1.2 moles.

The foregoing raw-mix constituents are thoroughly mixed together by ball or pebble milling or by other suitable mixing means. As a specific example, these raw-mix constituents may be mixed in a conical blender with an agitator for a period of one-half hour. The mixed raw-mix constituents are then fired at a temperature of from about 1220° C. to about 1280° C. In practice it has been found desirable to fire in covered silica trays with 1.3 kilograms of raw-mix per tray for a period of two hours at a temperature of about 1260° C., which is the preferred firing temperature. The period of firing may vary greatly depending on the size of the batch being fired and if a very small amount of raw-mix material is being fired (e.g., a layer of material one millimeter thick), a firing time of ten minutes at the specified temperature will normally suffice. The firing temperatures as indicated were measured by means of a thermocouple projecting into the furnace and about one-quarter inch above the cover of the firing tray.

Reference to the sole figure will illustrate the unexpected effect of increased firing temperature on both the "y" coordinate of the phosphor material of this invention and the output of the lamp, the processed phosphor material being excited with 2537 A.U. and the lamp being a 40 w. T12 type. In this figure the curve of "y" coordinate vs. firing temperatures is shown as a dotted line and the curve of lamp output (in arbitrary units) vs. firing temperatures is shown as a full line. Both of these curves break and start to level off at a firing temperature of about 1220° C., with the maximum output and "y" coordinate occurring at a firing temperature of about 1260° C. The maximum firing temperature is indicated at about 1280° C. and this is dictated by the fact that above this temperature the phosphor becomes excessively hard and requires excessive grinding after firing to break it up, which tends to reduce the output. Thus the limitations in permissible firing temperatures for the improved phosphor of this invention are from about 1220° C. to about 1280° C. with the preferred firing temperature being about 1260° C. Of course the phosphor material can be fired at temperatures less than about 1220° C., but both the "y" coordinate and lamp output decrease sharply below this figure.

The raw-mix components or constituents for the phosphor material of this invention may vary considerably. Starting with the so-called phosphor unit for the halophosphate phosphor of this invention, namely $3Sr_3(PO_4)_2 \cdot Sr(F_2$ or mixtures of $F_2$ plus $Cl_2)$ it has been found that for every 2 moles of $Sr_3(PO_4)_2$ there should be from 0.10 to 0.35 mole of excess $P_2O_5$ and 1 to 1.25 moles of total strontium halide (either fluoride or mixtures of fluoride and chloride). The phosphor unit can be differently expressed as: $9SrO \cdot (3.1$ to $3.35)P_2O_5 \cdot (1$ to $1.25)Sr(halide)$. The molar ratio of strontium fluoride to strontium chloride may vary from 2:1 to all fluoride. The activator materials for this phosphor unit are preferably and customarily expressed as a percent by weight of the phosphor unit and the concentration of manganese activator material may vary from 0.5% to 2.8% by weight with the preferred manganese activator concentration being from 1.0% to 1.4% by weight of the phosphor unit. The concentration of antimony activator may vary from 0.5% to 6.0% by weight with the preferred antimony activator concentration being from 1.0% to 3.0% by weight of the phosphor unit.

Many different raw-mix materials may be substituted for the materials given in the foregoing deferred example and the resulting luminescent material will be the same. Broadly, the raw-mix materials may be broken down into four main categories. First, strontium- and phosphorous- and oxygen-containing material which can react to form $3Sr_3(PO_4)_2$ with an excess of from 0.10 to 0.35 mole of $P_2O_5$ over the total moles of $3Sr_3(PO_4)_2$ which would be formed if all of the strontium were present as the orthophosphate. In other words, if there are 9 moles of SrO and 3.18 moles of $P_2O_5$ in the raw mix and these components are reacted, the resulting compound may be expressed as 3 moles of $Sr_3(PO_4)_2$ with an excess of 0.18 mole of $P_2O_5$. It is of course understood that the $Sr_3(PO_4)_2$ forming material should be free from non-volatile constituents other than the essential elements constituting the phosphor, namely strontium, phosphorous, oxygen, manganese, antimony and either fluorine or fluorine and chlorine.

The second category for the raw-mix constituents constitutes strontium- and fluorine-containing material or strontium- and chlorine- and fluorine-containing material which can respectively react to form $SrF_2$ and mixtures of $SrF_2$ and $SrCl_2$ with the ratios of fluoride- and chloride-forming material as hereinbefore specified.

The third category for the raw-mix constituents constitutes manganese-containing material which can supply manganese in the heretofore prescribed amounts to activate the phosphor unit. The fourth category for the raw-mix constituents constitutes antimony-containing material which can supply antimony in the heretofore prescribed amounts to activate the phosphor unit. Of course all of the materials contained in the aforementioned raw-mix constituent categories should be free from non-volatiles other than the essential elements for the phosphor. Also, when the aforementioned products of formation such as $Sr_3(PO_4)_2$ are referred to, it is not meant that these compounds as such exist in the phosphor. All that is meant is that raw-mix materials, which when reacted individually can form the indicated compounds, will be suitable as raw-mix components for the luminescent material.

Following are four tables in which are listed raw-mix components which may be used to form the phosphor. These tables are broken down as follows: Table I lists strontium orthophosphate and excess $P_2O_5$ forming materials. Table II lists strontium fluoride or strontium fluoride-strontium chloride forming materials. Table III lists manganese-containing compounds which can supply activating manganese to the phosphor unit. Table IV lists antimony-containing compounds which can supply activating antimony to the phosphor unit. Any one of the individual compounds as given in Table I may be mixed with any one of the individual compounds as selected from each of the Tables II, III and IV. The materials listed under Table I are indicated in sufficient amounts to form three moles of strontium orthophosphate and the rest of the compounds as listed under the remaining tables are indicated in the molar proportions as required to combine with the indicated molar amounts for the raw-mix compounds indicated under Table I.

*Table I*

Examples of strontium- and phosphorous- and oxygen-containing material which will form $3Sr_3(PO_4)_2$ with from 0.10 to 0.35 mole excess $P_2O_5$:

| Raw Materials | Moles |
|---|---|
| $SrHPO_4$ | 6.2 to 6.7 |
| $SrCO_3$ | 2.8 to 2.3 |
| $(NH_4)_2HPO_4$ | 6.2 to 6.7 |
| $SrCO_3$ | 9.0 |
| $Sr_3(PO_4)_2$ | 3.0 |
| $(NH_4)_2HPO_4$ | 0.2 to 0.7 |
| $Sr_2P_2O_7$ | 3.1 to 3.35 |
| $SrCO_3$ | 2.8 to 2.3 |

NOTE.—$SrCO_3$ could be replaced by other strontium compounds, such as the oxalate. Also, other ammonium phosphates might be used instead of $(NH_4)_2HPO_4$ (e.g. $NH_4H_2PO_4$).

*Table II*

Examples of strontium- and fluorine- and chlorine-containing materials, to give 1.00 mole, and 1.25 mole total Sr halide per molar phosphor unit:

| Molar Ratio, SrF$_2$/SrCl$_2$ | 1.00 mole halide | | 1.25 mole halide | |
|---|---|---|---|---|
| | 2/1 | ∞ | 2/1 | ∞ |
| SrF$_2$ | 0.666 | 1.00 | 0.833 | 1.25 |
| SrCl$_2$ | 0.333 | | 0.416 | |
| SrF$_2$ | 0.666 | 1.00 | 0.833 | 1.25 |
| SrCO$_3$ | 0.333 | | 0.416 | |
| NH$_4$Cl | 0.666 | | 0.832 | |
| SrCO$_3$ | 0.666 | 1.00 | 0.833 | 1.25 |
| NH$_4$F | 1.332 | 2.00 | 1.666 | 2.50 |
| SrCl$_2$ | 0.333 | | 0.416 | |
| SrCO$_3$ | 1.000 | 1.00 | 1.250 | 1.25 |
| NH$_4$F | 1.332 | 2.00 | 1.666 | 2.50 |
| NH$_4$Cl | 0.666 | | 0.832 | |

Note.—Other compounds could be substituted, such as organic compounds of Sr, NH$_4$HF$_2$, which contain no non-volatile constituents other than the essential elements of the phosphor.

Note.—As one approaches 100% fluoride, it is desirable to approach the 1.00 mole halide content. As one approaches a fluoride to chloride ratio of 2:1, it is desirable to approach the 1.25 mole halide content.

*Table III*

Examples of compounds which may be used for introduction of Mn, and quantities of these materials required to provide indicated Mn concentration. All figures are moles of Mn compound per phosphor unit:

3Sr$_3$(PO$_4$)$_2$·(0.10 to 0.35)P$_2$O$_5$·(1.10 to 1.25) (Sr halide)

| Mn Compound | Permissible Range—Moles per phosphor unit | | | |
|---|---|---|---|---|
| | | Preferred Range | | |
| MnCO$_3$ | 0.135 | 0.27 | 0.38 | 0.76 |
| Mn$_3$(PO$_4$)$_2$* (Other phosphates may be used) | 0.045 | 0.09 | 0.127 | 0.253 |
| MnF$_2$** | 0.135 | 0.27 | 0.38 | 0.76 |
| MnCl$_2$** | 0.135 | 0.27 | 0.38 | 0.76 |
| Mn(OH)$_2$ | 0.135 | 0.27 | 0.38 | 0.76 |
| MnO | 0.135 | 0.27 | 0.38 | 0.76 |

*Note.—P$_2$O$_5$-containing compounds in Table I decreased a corresponding molar amount.
**Note.—Halide-containing compounds in Table II decreased a corresponding molar amount.
Note.—0.135 mole of Mn will provide 0.5% by weight of Mn in the phosphor unit.

*Table IV*

Examples of compounds which may be used for introduction of Sb, and quantities of these materials required to provide indicated Sb concentration:

Figures are moles of Sb compound per phosphor unit:
3Sr$_3$(PO$_4$)$_2$·(0.10 to 0.35) P$_2$O$_5$·(1.00 to 1.25) (Sr halide).

| | Permissible Range—Moles Per Molar Phosphor Unit | | | |
|---|---|---|---|---|
| | | Preferred Range | | |
| Sb$_2$O$_3$ (Other oxides may be used) | 0.03 | 0.06 | 0.18 | 0.36 |
| SrO.Sb$_2$O$_5$* (Requires compensation in Table I) | 0.03 | 0.06 | 0.18 | 0.36 |
| SbPO$_4$* | 0.06 | 0.12 | 0.36 | 0.72 |

*Note.—P$_2$O$_5$-containing compounds in Table I decreased a corresponding molar amount.
Note.—0.06 mole Sb will provide 0.5% by weight of Sb in the phosphor unit.

Any of the individual groups of compounds indicated under Table I may be mixed with any of the individual groups indicated under Tables II, III and IV to provide the raw-mix composition. This raw mix may then be mixed together as specified for the heretofore-given preferred example and then fired at temperatures as specified for the heretofore-given preferred example. It will be recognized that the possible combinations of raw-mix compositions are numerous. Also the foregoing tables are by no means all-inclusive, but are only indicative of what constitutes suitable raw mix compositions.

An example of a cool white delux blend may consist of 28% by weight of blue-white halophosphate (ICI: $x=0.225$, $y=.287$), 27% by weight of CaSiO$_3$: Mn:Pb and 45% by weight of the strontium halophosphate of this invention.

It will be recognized that the objects of the invention have been achieved by the provision of a strontium halophosphate phosphor material and method of making same, which phosphor material has a high output in the green region of the spectrum.

It should be understood that strontium phosphates or compounds used to produce such phosphates as procured commercially often contain small traces or impurities of calcium. These can be tolerated in the phosphor without appreciable decreasing its performance. The same would apply to small amounts of calcium deliberately added, which in very small quantities would have only a limited effect in decreasing "y" coordinate of the phosphor.

While in accordance with the patent statutes one best embodiment has been illustrated and described in detail, it is to be particularly understood that the invention is not limited thereto or thereby.

I claim:

1. A strontium halophosphate phosphor material activated by antimony and manganese and having as essential elements Sr, P, O, Mn, Sb and one of the group consisting of F and F plus Cl and consisting of the fired reaction product of: strontium- and phosphorous- and oxygen-containing material which can form Sr$_3$(PO$_4$)$_2$ with an excess of P$_2$O$_5$ and which material is free from non-volatile constituents other than said essential elements, one of the group consisting of strontium- and fluorine-containing material and strontium- and fluorine- and chlorine-containing material which can respectively form SrF$_2$ and mixtures of SrF$_2$ and SrCl$_2$ and which material is free from non-volatile constituents other than said essential elements, manganese-containing material consisting of manganese compounds which are free from non-volatile constituents other than said essential elements and antimony-containing material consisting of antimony compounds which are free from non-volatile constituents other than said essential elements; said essential element-containing materials being present in the following stated proportions: said Sr$_3$(PO$_4$)$_2$ and excess P$_2$O$_5$-forming material being present in amounts sufficient to form 3 moles Sr$_3$(PO$_4$)$_2$ with an excess of from 0.10 to 0.35 mole P$_2$O$_5$, said strontium halide-forming material being present in amounts sufficient to form from 1 to 1.25 moles of total strontium halide with the molar ratio of SrF$_2$ to SrCl$_2$ being from 2:1 to all SrF$_2$, said manganese-containing compound being present in amounts to provide from 1.0% to 1.4% by weight of Mn expressed as a percent by weight of the phosphor, said antimony-containing compound being present in amounts to provide from 1.0% to 3.0% by weight of Sb expressed as a percent by weight of the phosphor; the phosphor having been made by mixing together the foregoing raw-mix components; and firing said mixed raw-mix components at from about 1220° C. to about 1280° C.

2. A strontium halophosphate phosphor material activated by antimony and manganese and having as essential elements Sr, P, O, Mn, Sb and one of the group consisting of F and F plus Cl and consisting of the fired reaction product of: strontium- and phosphorous- and oxygen-containing material which can form Sr$_3$(PO$_4$)$_2$ with an excess of P$_2$O$_5$ and which material is free from non-volatile constituents other than said essential elements, one of the group consisting of strontium- and fluorine-containing material and strontium- and fluorineand chlorine-containing material which can respectively form $SrF_2$ and mixtures of $SrF_2$ and $SrCl_2$ and which material is free from non-volatile constituents other than said essential elements, manganese-containing material consisting of manganese compounds which are free from non-volatile constituents other than said essential elements and antimony-containing material consisting of antimony compounds which are free from non-volatile constituents other than said essential elements; said essential element-containing materials being present in the following stated proportions: said $Sr_3(PO_4)_2$ and excess $P_2O_5$-forming material being present in amounts sufficient to form 3 moles $Sr_3(PO_4)_2$ with an excess of from 0.10 to 0.35 mole $P_2O_5$, said strontium halide-forming material being present in amounts sufficient to form from 1 to 1.25 moles of total strontium halide with the molar ratio of $SrF_2$ to $SrCl_2$ being from 2:1 to all $SrF_2$, said manganese-containing compound being present in amounts to provide from 0.5% to 2.8% by weight of Mn expressed as a percent by weight of the phosphor, said antimony-containing compound being present in amounts to provide from 0.5% to 6.0% by weight of Sb expressed as a percent by weight of the phosphor; the phosphor having been made by mixing together the foregoing raw-mix components; and firing said mixed raw-mix components at from about 1220° C. to about 1280° C.

3. A strontium halophosphate phosphor material activated by antimony and manganese and having as essential elements Sr, P, O, Mn, Sb, F and Cl and consisting of: the fired reaction product of: strontium- and phosphorous- and oxygen-containing material which can form $Sr_3(PO_4)_2$ with an excess of $P_2O_5$ and which material is free from non-volatile constituents other than said essential elements, strontium- and fluorine- and chlorine-containing material which can form $SrF_2$ and $SrCl_2$ and which material is free from non-volatile constituents other than said essential elements, manganese-containing material consisting of manganese compounds which are free from non-volatile constituents other than said essential elements and antimony-containing material consisting of antimony compounds which are free from non-volatile constituents other than said essential elements; said essential element-containing materials being present in the following stated proportions; said $Sr_3(PO_4)_2$ and excess $P_2O_5$-forming material being present in amounts sufficient to form 3 moles $Sr_3(PO_4)_2$ with an excess of 0.18 mole $P_2O_5$, said strontium halide-forming material being present in amounts sufficient to form 1.2 moles of total strontium halide with the molar ratio of $SrF_2$ to $SrCl_2$ being 6:1, said manganese-containing compound being present in amounts to provide 1.2% by weight of Mn expressed as a percent by weight of the phosphor, said antimony-containing compound being present in amounts to provide 2.1% by weight of Sb expressed as a percent by weight of the phosphor; the phosphor having been made by mixing together the foregoing raw mix components; and firing said mixed raw-mix components at about 1260° C.

4. The method of preparing a manganese- and antimony-activated strontium halophosphate phosphor having as essential elements Sr, P, O, Mn, Sb and one of the group consisting of F and F plus Cl, comprising mixing the following raw-mix components: strontium- and phosphorus- and oxygen-containing material which can form $Sr_3(PO_4)_2$ with an excess of $P_2O_5$ and which material is free from non-volatile constituents other than said essential elements, one of the group consisting of strontium- and fluorine-containing material and strontium- and fluorine- and chlorine-containing material which can respectively form $SrF_2$ and mixtures of $SrF_2$ and $SrCl_2$ and which material is free from non-volatile constituents other than said essential elements, manganese-containing material consisting of manganese compounds which are free from non-volatile constituents other than said essential elements, and antimony-containing material consisting of antimony compounds which are free from non-volatile constituents other than said essential elements; said essential element-containing materials being present in the following stated proportions: said $Sr_3(PO_4)_2$ and excess $P_2O_5$ forming material being present in amounts sufficient to form 3 moles $Sr_3(PO_4)_2$ with an excess of from 0.10 to 0.35 mole of $P_2O_5$, said strontium halide-forming material being present in amounts sufficient to form from 1 to 1.25 moles of total strontium halide with the molar ratio of $SrF_2$ to $SrCl_2$ being from 2:1 to all $SrF_2$, said manganese-containing compound being present in amounts to provide from 1.0 to 1.4% by weight of Mn expressed as a percent by weight of the phosphor, said antimony-containing compound being present in amounts to provide from 1.0 to 3.0% by weight of Sb expressed as a percent by weight of the phosphor; mixing together the foregoing raw-mix components; and firing said mixed raw-mix components at from about 1220° C. to about 1280° C.

5. The method of preparing a manganese- and antimony-activated strontium halophosphate phosphor having as essential elements Sr, P, O, Mn, Sb and one of the group consisting of F and F plus Cl, comprising mixing the following raw-mix components: strontium- and phosphorous- and oxygen-containing material which can form $Sr_3(PO_4)_2$ with an excess of $P_2O_5$ and which material is free from non-volatile constituents other than said essential elements, one of the group consisting of strontium- and fluorine-containing material and strontium- and fluorine- and chlorine-containing material which can respectively form $SrF_2$ and mixtures of $SrF_2$ and $SrCl_2$ and which material is free from non-volatile constituents other than said essential elements, manganese-containing material consisting of manganese compounds which are free from non-volatile constituents other than said essential elements, and antimony-containing material consisting of antimony compounds which are free from non-volatile constituents other than said essential elements; said essential element-containing materials being present in the following stated proportions: said $Sr_3(PO_4)_2$ and excess $P_2O_5$ forming material being present in amounts sufficient to form 3 moles $Sr_3(PO_4)_2$ with an excess of from 0.10 to 0.35 mole of $P_2O_5$, said strontium halide-forming material being present in amounts sufficient to form from 1 to 1.25 moles of total strontium halide with the molar ratio of $SrF_2$ to $SrCl_2$ being from 2:1 to all $SrF_2$, said manganese-containing compound being present in amounts to provide from 0.5 to 2.8% by weight of Mn expressed as a percent by weight of the phosphor, said antimony-containing compound being present in amounts to provide from 0.5 to 6.0% by weight of Sb expressed as a percent by weight of the phosphor; mixing together the foregoing raw-mix components; and firing said mixed raw-mix components at from about 1220° C. to about 1280° C.

6. The method of preparing a manganese-and antimony-activated stontium halophosphate phosphor having as essential elements Sr, P, O, Mn, Sb, F and Cl, comprising mixing the following raw-mix components: strontium- and phosphorous- and oxygen-containing material which can form $Sr_3(PO_4)_2$ with an excess of $P_2O_5$ and which material is free from non-volatile constituents other than said essential elements, strontium- and fluorine- and chlorine-containing material which can form $SrF_2$ and $SrCl_2$ and which material is free from non-volatile constituents other than said essential elements, manganese-containing material consisting of manganese compounds which are free from non-volatile constituents other than said essential elements, and antimony-containing material consisting of antimony compounds which are free from non-volatile constituents other than said essential elements; said essential element-containing materials being present in the following stated proportions: said $Sr_3(PO_4)_2$ and excess $P_2O_5$ forming material being present in amounts sufficient to form 3 moles $Sr_3(PO_4)_2$ with an excess of 0.18 mole of $P_2O_5$, said strontium halide-forming material being present in amounts sufficient to form about 1.2 moles of total strontium halide with the molar ratio of $SrF_2$ to $SrCl_2$ being about 6:1, said manganese containing compound being present in amounts to provide 1.2% by weight of Mn expressed as a percent by weight of the phosphor, said antimony-containing compound being present in amounts to provide 2.1% by weight of Sb expressed as a percent by weight of the phosphor; mixing together the foregoing raw-mix components; and firing said mixed raw-mix components at about 1260° C.

7. A strontium halophosphate phosphor having 9 moles SrO, from 3.1 to 3.35 moles $P_2O_5$ and from 1.0 to 1.25 moles strontium halide, said strontium halide selected from the group consisting of fluoride and mixtures of fluoride and chloride with at least 2 moles of fluoride per mole of chloride, and including as activator materials from 0.5% to 2.8% by weight of manganese and from 0.5% to 6% by weight of antimony, and said phosphor having been fired during preparation at a temperature of from 1220° C. to 1280° C.

8. A strontium halophosphate phosphor having 9 moles SrO, from 3.1 to 3.35 moles $P_2O_5$ and from 1.0 to 1.25 moles strontium halide, said strontium halide selected from the group consisting of fluoride and mixtures of fluoride and chloride with at least 2 moles of fluoride per mole of chloride, and including as activator materials from 0.5% to 2.8% by weight of manganese and from 0.5% to 6% by weight of antimony, and said phosphor having been fired during preparation at a temperature of about 1260° C.

References Cited in the file of this patent

UNITED STATES PATENTS

| | | |
|---|---|---|
| 2,476,654 | Froelich | July 19, 1949 |
| 2,488,733 | McKeag | Nov. 22, 1949 |
| 2,579,900 | Butler | Dec. 25, 1951 |
| 2,824,072 | Butler | Feb. 18, 1958 |

FOREIGN PATENTS

| | | |
|---|---|---|
| 605,398 | Great Britain | July 22, 1948 |